United States Patent [19]
Sass et al.

[11] Patent Number: 5,597,045
[45] Date of Patent: Jan. 28, 1997

[54] PROCESS AND TOOL FOR LAYING UNDERGROUND COLLECTOR MAINS FOR LIQUIDS AND GASES

[75] Inventors: Ingo Sass, Hildebrand strasse 4, D-76227 Karlsruhe; Hans-Joachim Bayer, Ettlingen; Klaus Kleiser, Stutensee-Büchig; Jörg Gänger, Straubenhardt, all of Germany

[73] Assignees: Flowtex-Service Gesellschaft Fur Horizontalbohrsysteme mbH & Co. KG, Ettlingen; Ingo Sass, Karlsruhe; Schumacher Umweltund Trenntechnik, Crailshaim, all of Germany

[21] Appl. No.: 360,747

[22] PCT Filed: Apr. 21, 1994

[86] PCT No.: PCT/EP94/01248

§ 371 Date: Feb. 6, 1995

§ 102(e) Date: Feb. 6, 1995

[87] PCT Pub. No.: WO94/24414

PCT Pub. Date: Oct. 27, 1994

[30] Foreign Application Priority Data

Apr. 22, 1993 [DE] Germany ........................ 43 13 221.9

[51] Int. Cl.[6] .................................. E03B 3/11; E21B 7/28
[52] U.S. Cl. ............................ 175/62; 166/50; 166/227; 405/184
[58] Field of Search .......................... 175/61, 62; 166/50, 166/227, 236, 278; 405/43, 45, 36, 154, 184

[56] References Cited

U.S. PATENT DOCUMENTS

| | | | |
|---|---|---|---|
| 2,335,558 | 11/1943 | Young | 166/228 |
| 2,827,264 | 3/1958 | Sitton et al. | 175/398 |
| 2,950,087 | 8/1960 | Gregory | 175/103 |
| 2,981,332 | 4/1961 | Miller et al. | 166/276 |
| 3,357,564 | 12/1967 | Medford, Jr. et al. | 210/266 |
| 3,378,076 | 4/1968 | Metler | 166/376 |
| 3,534,816 | 10/1970 | Showalter | 166/285 |
| 3,907,033 | 9/1975 | Stuchlik | 166/228 |
| 4,003,440 | 1/1977 | Cherrington | 175/61 |
| 4,117,895 | 10/1978 | Ward | 175/53 |
| 4,445,574 | 5/1984 | Vann | 166/50 X |
| 5,040,601 | 8/1991 | Karlsson et al. | 166/278 |
| 5,123,492 | 6/1992 | Lizanec, Jr. | 175/49 |
| 5,209,605 | 5/1993 | Cherrington | 403/184 |
| 5,301,758 | 4/1994 | Jenne | 175/62 X |

FOREIGN PATENT DOCUMENTS 1204702  1/1986  U.S.S.R. ........................ 166/227

OTHER PUBLICATIONS

E. Bieske "Bohrbrunnen" (7th edition, 1992, Oldenbourg, Munich), pp. 19–23.
Preussag Firm Brochure (6 pp.) (undated).

*Primary Examiner*—David J. Bagnell
*Attorney, Agent, or Firm*—Wolf, Greenfield & Sacks, P.C.

[57] ABSTRACT

For the induction of underground collector mains, in particular for the construction of horizontal filter wells and drainage mains, at least one bore (1) having respectively an inlet aperture (3) and an outlet aperture (4) is introduced into predetermined layers of soil. Then a filter strand drawing in unit (5) which consists of an inner filter strand and an outer protective pipe is inducted into the respective bore (1) and finally the outer protective pump of the filter strand drawing in unit (5) is removed. The filter strand in unit is used as a tool consisting of an inner filter strand and an outer protective pipe. In a preferred further development, the intermediate space between the inner filter strand and the outer protective pipe is provided with filter sand and/or a filter gravel filling.

32 Claims, 2 Drawing Sheets

PROCESS AND TOOL FOR LAYING UNDERGROUND COLLECTOR MAINS FOR LIQUIDS AND GASES

BACKGROUND OF THE INVENTION

1. Field of the Invention

The invention concerns a process for laying underground collector mains for liquids and gases, in particular for the construction of horizontal filter wells and drainage mains, as well as a tool for carrying out the process.

2. Description of the Related Art

The construction of horizontal, arcuate, inclined or helical wells and drainage mains both for ground water and catchment water as well as for ground air, is summarily provided with the designation horizontal filter well construction. Conventional horizontal filter wells are used for the removal of ground water, which is led through horizontally disposed filter pipes into a vertical main shaft. From there, the water is brought to the surface by means of pumps. In the fields of old waste sanitation and security this type of wells can be used for the removal of noxious substances. Such horizontal filter wells have economic advantages of a technical process nature when compared with vertical wells and under certain circumstances.

With a horizontal filter well, the ground layer which conducts the ground water with a greater well capacity, corresponding to its yield, can be included. Furthermore, horizontal filter wells become ocherous significantly more slowly than vertical wells, because the horizontally positioned filter pipes do not come into contact with the air and the flow speeds in horizontal water inlets can be kept very low.

As a further advantage, it should be emphasized that the mechanical and pipe technology installations for pump pressure mains, measuring instruments and power supplies with electrical switching and control units demand a far smaller volume than in the case of vertical wells. Equally, the supervision and maintenance of a horizontal filter well, when measured against comparable vertical well installation, are not so costly.

In addition to the extraction of water, horizontal filter wells are in principle preferred for use where relatively level water reserves have to be sanitized, or in strongly layered ground, where a particular layer has to be opened up for the sanitation of the ground air. Moreover in areas which are built up or where a different type of use does not permit the construction of vertical layers, or where there are hydraulic needs, which make obvious the construction of a horizontal filter well, horizontal filter wells are used for preference.

Today, for horizontal filter wells primarily the processes in accordance with FEHLMANN and PREUSSAG are used. The processes in accordance with FEHLMANN and PREUSSSSAG are described in E. Bieske, "Bohrbrunnen" (7th edition, 1992, Oldenbourg, Munich). In addition, the Preussag firm issues a brochure in which the Preussag process is described in detail. The modus operandi will be briefly explained using the example of the Preussag process: in this process, a main shaft which reaches as far as the ground water reserve is previously prepared and plugged. From one working plane, radiating or fan-shaped straight horizontal bores are constructed with bore pipes. In these bore pipes, the filter pipes are then installed. Then the bore pipes are gradually extracted from the bores, while filter gravel is washed into the cavity between the bore and the filter pipe under high pressure, so that the filter gravel can be deposited between the wall of the bore and the filter pipe. This filter jacket can consist of filter gravel or of filter sand. These known processes have the disadvantage that a vertical shaft having a width of at least 2.5 m in diameter has to be constructed in the soil. Furthermore, a work platform has then to be built with the bore and insertion installation in the shaft, and the horizontal bores have to be produced in the soil layers at great cost.

The horizontal bores in this process can only achieve a limited length of up to about 60 m, and this only when they are straight. The possible lengths of the bore are predetermined by the soil properties.

In addition, during the entire construction period of the horizontal filter well, when using the known processes, ground water flows constantly into the central shaft, which has either to be prevented or has to be pumped at great cost.

These known processes are therefore laborious, costly and can only be built economically as from predetermined magnitudes.

It is the object of the present invention to develop a totally new process, which makes the simple introduction, which can be rapidly carried out, of underground horizontal filter wells and drainage mains possible, as well as to provide a tool for the implementation of the process.

SUMMARY OF THE INVENTION

In an illustrative embodiment of the invention, a process is provided to lay underground collector mains for liquids and gases. The process includes introducing at least one bore having an entry aperture and an exit aperture into predetermined soil layers using a steerable boring device, drawing a filter strand drawing in unit into the bore and removing an outer protective pipe of the filter strand drawing in unit. The bore extends downwardly into the soil layers from the entry aperture and upwardly out of the soil layers to the exit aperture, wherein at least a portion of the bore is substantially horizontal.

In another illustrative embodiment of the invention, a tool is provided to lay underground collector mains. The tool comprises a drill rod, a drilling head adapted to be coupled to the drill rod, and a filter drawing in unit adapted to be coupled to the drill rod. The drilling head is a remote controlled drilling head that can be steered in multiple directions. The filter strand drawing in unit includes a filter strand.

The invention is based on the idea of providing the necessary horizontal bores from the surface (e.g. without a shaft in flat country) and introducing into these bores the already prefabricated filter mains construction with suitable filter pipes and a filter gravel jacket, the so-called filter strand, from the surface into the bores. In this connection what is meant here by a filter strand is an internal filter pipe having one or more parts, with a gravel jacked consisting of one or more parts.

To insert the bore, advantageously a totally controlled drilling process is used, which was originally developed for supply technology.

Here a totally controllable remote controlled drill head is used, which makes it possible for curved or arcuately extending bores to be constructed. Such a process controlled drilling process has the advantage for the construction of horizontal filter wells that the compressions of the ground in most types of soil are kept within a range which is tolerable for ground air, catchment water or ground well construction.

During the drilling, with mechanical feed a high pressure water jet cuts a micro-tunnel in the soil. Advantageously, a support suspension for the bore hole is mixed with this high pressure water jet, whereby a part of the dissolved soil material is pressed into the surrounding matrix and a part is carried out with the bore suspension. Thereby on the one hand, the bore hole is stabilized and on the other, a certain sliding effect is generated during the introduction of a filter strand drawing in unit, depending on the composition of the drilling fluid. What is meant here by a filter strand drawing in unit is the tool for the implementation of the process in accordance with the illustrative embodiments of the invention described above. Because of the displacement of the material, minor changes in permeability occur, which are regulated by the type and manner of the drilling in detail and by the amount of the fluid pressure and fluid composition which are used. In addition, depending on the drilling conditions it can be particularly advantageous to use a bentonite-free drilling suspension, which is surface water neutral and is biologically decomposable. This drilling suspension makes it possible that no additional reductions in the permeability of the soil are generated. In order to introduce filter strand drawing in units having a diameter larger than that of the micro-tunnel into the bore, it is advantageous to expand the first bore of small diameter by means of an expansion head. For this purpose, the drill head is replaced after its exit from the exit aperture of the bore by the expansion head and the latter is then drawn back through the pilot bore and/or through the micro-tunnel in a hydraulic-mechanical modus operandi.

For the introduction or drawing in of a filter strand drawing in unit of especially large diameter, it is advantageous to expand the original bore repeatedly step by step with expansion heads of different magnitude. When this is necessary is defined essentially by the properties of the soil, the drilling technology and the purpose of the horizontal filter wells and the drainage mains.

In order to make possible the rapid positioning of the filter strands, it is an advantage to couple the filter strand drawing in unit directly on the expansion head, whereby the filter strand drawing in unit is inducted into the expanded bore during the expansion process.

The diameter of the expansion head should as far as possible be at least identically large or larger than the diameter of the filter strand drawing-in unit, in order to permit the smallest possible frictional forces when drawing it into the bore.

When the last expansion process is carried aout, the filter strand drawing in unit with the expansion head is drawn in following the hydraulic-mechanically operating expansion head. In the inlet aperture, the filter strand can be fixed on the surface, and the protective pipe of the filter strand drawing in unit can be extracted to the other aperture. This results in an annular space between the filter strand and the wall of the bore hole, which is closed by overburden, which has favourable effects on the permeability of the environment of the well. For this reason it may be especially advantageous to choose an expansion head diameter which is substantially larger than that of the protective pipe.

In order not to extract the actual filter main construction when drawing out the outer protective tube, it is an advantage to fix the enclosed filter strand and/or the enclosed filter pipe above ground.

Depending on the soil properties and on the special purpose of the well, it may be advantageous firstly to draw in only one protective pipe into the bore and only then to insert the actual filter strand into the protective pipe.

For the implementation of the process, a tool is used having an outer protective pipe, which surrounds a filter pipe placed within it, wherein advantageously the intermediate space between the filter strand and the external protective pipe is filled by a filter sand and/or filter gravel filling (filter gravel jacket). Such a structure makes it possible for the distribution of the filter gravel filling and of the filter main which is embedded within it to be carried out optimally in accordance with the requirements. In addition, it becomes possible that the structure of the filter strand can be prefabricated and thereby defective points can be avoided. This arrangement is also very advantageous because the total structure of the filter strand construction can be controlled in advance before it is positioned.

Depending on the circumstances of the soil, the jacketing of the filter pipe with filter gravel or filter sand may not be necessary, and then it is advantageous in order to save costs to draw in only one filter pipe in the external protective pipe into the bore.

In accordance with the invention, the filter strand structure can be optimally adapted to the hydrological circumstances. On the one hand, it is possible to undertake the filling between the filter pipe and the wall of the bore with coarse grained filter materials of different sizes, and on the other, this filling can be built up in a predetermined manner and can also be controlled before installation.

On the basis of the production in accordance with the invention of the entire filter strand before its installation, other variations of this structure are possible for optimal adaptation to the geological circumstances.

Thus it may be advantageous for process technology and economic reasons to introduce the actual filter drain only in partial segments of the total bore.

Due to the structure in accordance with the invention and the prefabrication of the entire filter strand, a structure in accordance with the DIN is possible. Because of the prefabrication of the filter strand, optimal well performance can be achieved.

All the previously known filter drain materials can be used for the tool in accordance with the invention. Thus, in addition to conventional and usual materials in the construction of wells, filter pipes of every type with non-woven materials, textiles and membranes can be installed with an internal support pipe in the filter strand. The filter pipe can iself be a porous self-supporting plastic filter type, which consists of PE, PVDF, PTFE, PT, PU, PVC or the like. Equally, porous self-supporting ceramic or sintermetal filter pipes or filter pipes which consist of other porous self-supporting materials can be used in the filter strand.

The structure of the individual filter strands can advantageously also be adapted to the geological process technology requirements with respect to the geometry. For this purpose, the filter strand unit is constructed with varying flexibility, if necessary, so that the most varied radii of curvature of the horizontal filter wells or of the drainage mains and of the bore hole are possible.

In accordance with the invention, the outer protective pipe is made of a smooth, stable plastic such as polyethylene or the like, whereby the insertion of the filter strand drawing in unit into the bore is facilitated. Due to the tool in accordance with the invention, the sensitive filter strand is protected against drill fluid and the access of wet rock cuttings and the outer protective pipe relaxes the actual filter strand and keeps it free from frictional forces.

The process in accordance with the invention can open up totally new fields, because the individual filter strands can be varied in their number, diameter and lengths up to 500 m (still longer granted the corresponding drilling technology). Equally, very small diameters of the individual filter mains become possible, which cannot be achieved by using the known processes.

In the process in accordance with the invention, it is also possible to control the respective segment of the filter strand and/or of the filter pipe by the insertion of a camera even during the drawing in process. Damage which may occur to the filter strand during the draw in can therefore at once be determined and possibly be overcome.

BRIEF DESCRIPTION OF THE DRAWINGS

For the further explanation and a better understanding of the invention, an example of an embodiment of a horizontal filter well constructed in accordance with the process of the invention as well as the inventive tool for carrying out this process is described and explained below, with reference to the enclosed drawings. They show.

DETAILED DESCRIPTION OF THE INVENTION

Figure 1:
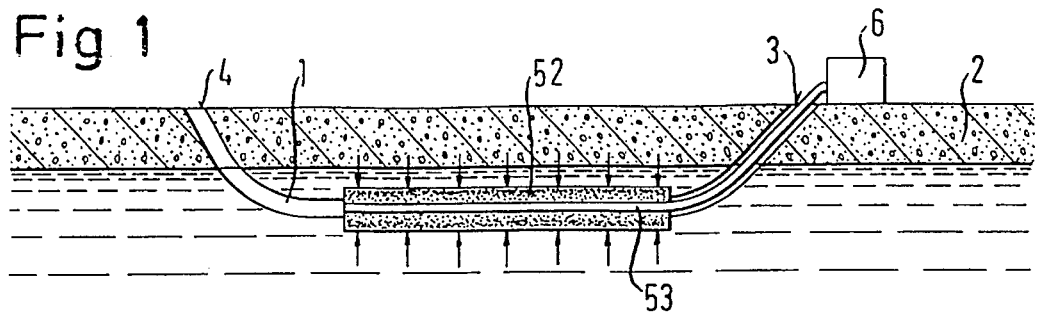
FIG. 1 an examplary undercutting.
Figure 2:
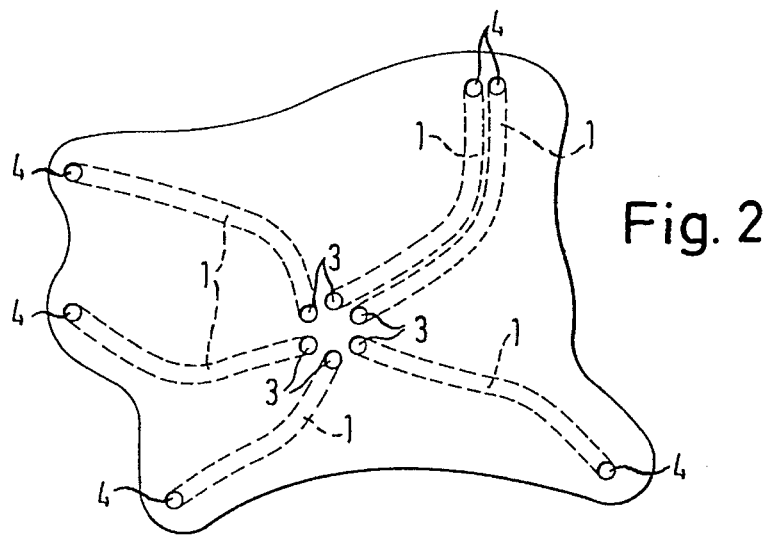
FIG. 2 a plan view with exemplary forms of the wells and drains.

As follows from FIGS. 1 and 2, a horizontal filter well which is built in accordance with the process of the invention comprises one or more, slightly or strongly curved bores 1, which extend from a central location in parallel or different or in the same soil layers 2. Each individual bore 1 has an intake aperture 3 and an outlet aperture 4, through which the filter strand drawing in unit 5 is inducted. The actual filter strand 52, 53 is below the level of the ground water in the unsaturated zone or in the catchment water. On the surface, an extraction device 6 is located, in which the pumps, suction devices, vacuum generators or the like which are used to convey the ground water, the catchment water or the ground air are accommodated. The filter pipe 53 is sealed tightly to the segments which are above and below the ground layer to be treated and has only within the ground layers to be treated of the bore permeabilities due to apertures, slits, pores 54 or the like in the filter pipe 53, through which the ground water, catchment water or the ground air can flow in. The untreated segments are constructed, as is usual in the construction of wells, with monoblock pipes instead of the filter strand 52, 53.

Figure 3:
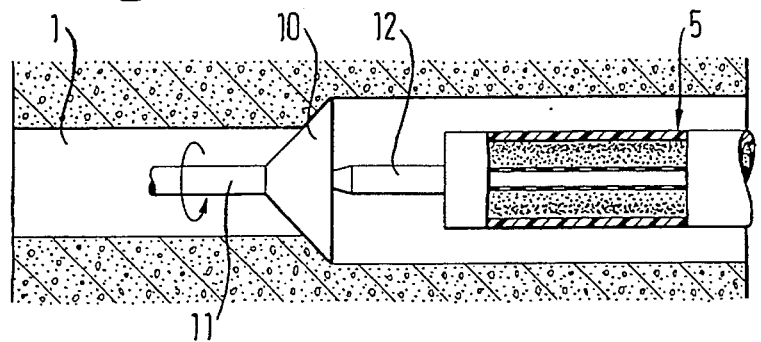
FIG. 3 a schematic illustration of an exemplary expansion process.

In FIG. 3 it is discernible that the expansion head 10 is coupled to the drill rod 11. Behind the expansion head 10, the filter strand drawing in unit 5 is connected with the expansion head 10 by a connector 12.

Figure 4:
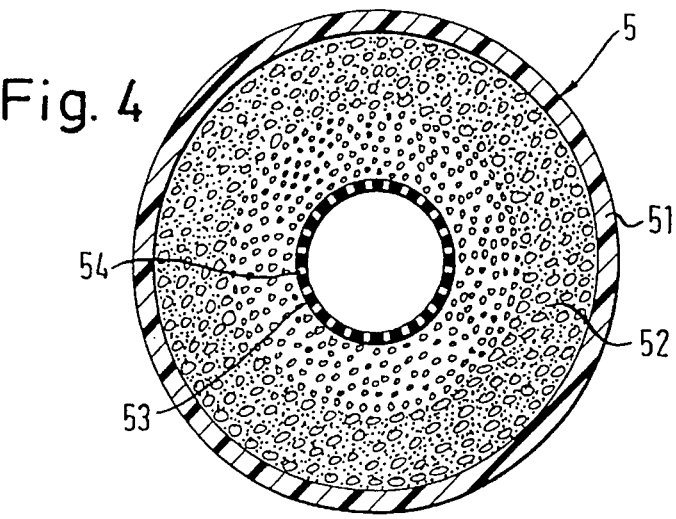
FIG. 4 a schematic section perpendicular to the filter strand (embodiment) with the protective pipe still undrawn.

From FIG. 4, it is seen that the filter strand drawing in unit comprises an outer protective type 51, a filling 52 of different grain and a filter pipe 53. The actual filter strand consists of the filter gravel filling 52 and the filter pipe 53.

Below the process in accordance with the invention for the installation of underground collector mains 53 will be explained.

Figure 1A:
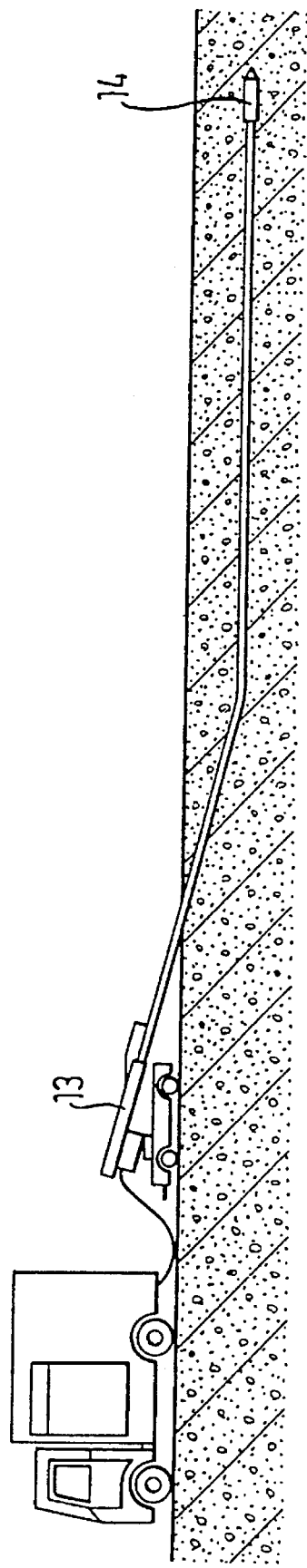
FIG. 1a a schematic illustration of the advancement of a bore.

As is discernible from FIG. 1a, a drill head 14 is moved forward by a drill instrument 13 with the formation of an entry aperture 3 in the soil. During the entire drilling process, the drilling head 14 is followed by a locating device and in accordance with the requirements it is driven in the respectively desired direction by remote control. The bore is guided as far as an exit aperture 4, on which the drill head 14 is replaced by an expansion head 10. On the expansion head 10, which is mounted on the drill rod 11, there is a connector 12, on which the prefabricated filter strand drawing in unit 5 is coupled. Now the drill rod 11 is retracted towards the entry aperture 3, wherein the drill rod 11 is moved rotationally by water pressure jets with the expansion head 10 through the bore hole 1, and thereby the bore 1 is enlarged in its diameter by means of the expansion head 10. Simultaneously with this expansion process, the filter strand drawing in unit 5 is inducted as far as the entry aperture 3. During the expansion process, a drilling suspension which is composed in accordance with the requirements of the soil is introduced through the nozzle or nozzles which are mounted on the expansion head 10 into the loosened soil of the wall 1 of the bore. Due to this drilling suspension, the friction on the external protective pipe 51 of the filter strand drawing unit 5 as well as the necessary force expended to retract the drill rod 11 and the filter strand drawing unit 5 are reduced and in addition, the bore hole 1 is stabilized.

During the expansion process, the wall of the bore hole 1 is opened and can drop onto the outer protective pipe 51 of the filter strand drawing unit 5, if the soil conditions, the drilling technology in detail and the washing parameters permit this. Thereby a desired higher permeability of the soil is achieved in the area of the wall of the bore.

After the filter strand drawing unit 5 has arrived at the entry aperture 3, the filter pipe 53 is fixed above ground. Then the outer protective pipe 51 is drawn out of the bore hole 1 from the other aperture 4.

To reduce the frictional forces, when extracting the outer protective pipe 51 from the bore 1, plastic granulates of predetermined grain size can be used as the filter filling 52. Equally it is possible to introduce water under pressure into the filter pipe 53 from the entry aperture 3, which again emerges below ground through the apertures 54 in the filter pipe 53 and in addition it reduces the friction between the filter strand 52, 53 and the outer protective pipe 51.

The horizontal filter wells which are formed by the bores 1 and the filter strands 52, 53 which are drawn into them can be operated in various ways.

It is conceivable that one of the apertures 3, 4 should be tightly sealed, whereby vacuum operation of the individual bore 1 and/or of the filter strands 52, 53 becomes possible. Other methods of operation such as gravity dehydration and combined ground air extraction by suction and dehydration as well as by seepage and compression can also be carried out.

What is claimed is:

1. A process for laying underground collector mains for liquids and gases, the process comprising steps of:

introducing at least one bore having an entry aperture and an exit aperture into predetermined soil layers using a steerable boring device, the bore extending downwardly into the soil layers from the entry aperture and upwardly out of the soil layers to the exit aperture, at least a portion of the bore being substantially horizontal, drawing a filter strand drawing in unit, which includes a filter strand and an outer protective pipe, into the bore, and removing the outer protective pipe of the filter strand drawing in unit.

2. The process in accordance with claim 1, wherein the step of introducing the bore includes using a steerable, remote controlled drilling head for drilling the bore.

3. The process in accordance with claim 1, wherein after the step of introducing the bore, the process further comprises a step of expanding the bore using an expansion head.

4. The process in accordance with claim 3, further comprising steps of removing the drilling head from a drill rod after exiting the exit aperture of the bore, and connecting the expansion head to the drill rod.

5. The process in accordance with claim 4, further comprising a step of coupling the filter strand drawing in unit to the expansion head.

6. The process in accordance with claims 3, 4 or 5, wherein the step of drawing the filter strand drawing in unit includes retracting the expansion head through the bore towards the entry aperture.

7. The process in accordance with claim 6, wherein the filter strand drawing in unit has a diameter, and wherein the step of expanding includes using an expansion head having a diameter that is not less than the diameter of the filter strand drawing in unit.

8. The process in accordance with claim 5, wherein the step of expanding the bore is repeated using expansion heads of different sizes, and wherein the step of coupling the filter strand drawing in unit occurs prior to a final expansion step.

9. The process in accordance with claim 1, further comprising a step of fixing the filter strand of the filter strand drawing in unit above ground.

10. The process in accordance with claim 1, wherein after the step of introducing the bore, the step of drawing includes inducting the outer protective pipe in the bore.

11. The process in accordance with claim 10, wherein the step of drawing further includes inserting the filter strand in the protective pipe.

12. The process in accordance with claim 1, wherein the step of introducing the bore includes using a drilling suspension for drilling which is surface water neutral and biologically decomposable.

13. The process in accordance with claim 12 wherein the bore suspension does not reduce the permeability of the soil.

14. The process in accordance with claim 1, wherein the step of introducing the bore includes drilling the bore to have a length of at least 500 m.

15. The process in accordance with claim 1, wherein the step of removing the outer protective pipe includes pressing water through the filter strand under pressure into the bore as the outer protective pipe is removed.

16. The process in accordance with claims 1 or 2, wherein the step of introducing the bore includes drilling the bore along a curved path.

17. The process in accordance with claims 1 or 2, wherein the step of introducing the bore includes moving the bore forward to predetermined points.

18. The process in accordance with claims 1 or 2, further comprising a step of introducing a camera into the filter strand for checking the filter strand.

19. A tool for laying underground collector mains, the tool comprising:

a drill rod;

a remote controlled drilling head adapted to be coupled to the drill rod, the drilling head being constructed and arranged to be steerable in multiple directions; and a filter strand drawing in unit including a filter strand, the filter strand drawing in unit being adapted to be coupled to the drill rod.

20. The tool in accordance with claim 19, wherein the filter strand drawing in unit:

further includes an outer protective pipe, the filter strand being disposed within the outer protective pipe, wherein the filter strand includes a filter pipe and a filter filling disposed in an intermediate space between the filter pipe and the outer protective pipe, the intermediate space being filled with the filter filling.

21. The tool in accordance with claim 20, wherein the filter pipe comprises an internal support pipe adapted to support at least one of a non-woven material, a textile and a membrane.

22. The tool in accordance with claim 20, wherein the filter pipe includes a porous self-supporting plastic filter pipe.

23. The tool in accordance with claims 19, or 20, wherein the filter strand includes at least one of a geotextile and a membrane and a support device therefor.

24. The tool in accordance with claims 19 or 20, wherein the filter strand includes a non-woven filter material and a support device therefor.

25. The tool in accordance with claims 19 or 20, wherein the filter strand includes one of a porous self-supporting ceramic filter pipe and a sintered metal filter pipe.

26. The tool in accordance with claim 20, wherein the outer protective pipe comprises polyethylene.

27. The tool in accordance with claim 20, wherein the filter filling between the filter pipe and the outer protective pipe includes a plastic granulate.

28. The tool in accordance with claim 23, wherein the filter filling is disposed between the filter pipe and the outer protective pipe in a predetermined partial segment.

29. The tool in accordance with claim 20, wherein the filter filling between the filter pipe and the outer protective pipe is disposed at predetermined partial segments of the filter strand drawing in unit.

30. The tool in accordance with claim 20, wherein the filter filling between the filter pipe and the outer protective pipe includes various layers.

31. The tool in accordance with claim 30, wherein the various layers includes at least one of a coarse grained filter sand and a filter gravel of various sizes.

32. The tool in accordance with claim 19, wherein the filter strand drawing in unit has an internal structure that is constructed in accordance with DIN standards.

\* \* \* \* \*